(12) United States Patent
Yakushiji

(10) Patent No.: US 7,864,688 B2
(45) Date of Patent: Jan. 4, 2011

(54) COMMUNICATION SYSTEM, METHOD OF PROVIDING INFORMATION THEREIN AND COMMUNICATION DEVICE

(75) Inventor: Hidehito Yakushiji, Kanagawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 12/004,859

(22) Filed: Dec. 21, 2007

(65) Prior Publication Data
US 2008/0151744 A1 Jun. 26, 2008

(30) Foreign Application Priority Data
Dec. 26, 2006 (JP) ............................ P2006-350108

(51) Int. Cl.
*H04L 9/00* (2006.01)
(52) U.S. Cl. ...................... 370/242; 370/216; 370/241; 714/100; 714/1; 714/25; 714/26; 714/27
(58) Field of Classification Search ................. 370/216, 370/217, 218, 241, 242, 244, 245, 503, 504, 370/505, 506, 507, 508, 509, 510, 511, 512; 709/223, 224; 340/500–506; 375/224–228; 379/1.01–35; 714/100, 1, 25–46
See application file for complete search history.

(56) References Cited
U.S. PATENT DOCUMENTS
6,693,921 B1* 2/2004 Whitfield .................... 370/516

2001/0038647 A1* 11/2001 Bernath et al. ............... 370/503
2002/0105911 A1* 8/2002 Pruthi et al. ................. 370/241
2002/0163918 A1* 11/2002 Cline .......................... 370/399
2003/0081556 A1* 5/2003 Woodall ...................... 370/241
2006/0203729 A1* 9/2006 Deshpande ................. 370/235

FOREIGN PATENT DOCUMENTS
| JP | 7-115437 | 5/1995 |
| JP | 9-130414 | 5/1997 |
| JP | 284627 | 10/1997 |
| JP | 11 177549 | 7/1999 |
| JP | 2000-286923 | 10/2000 |
| JP | 2003-338824 | 11/2003 |

* cited by examiner

*Primary Examiner*—William Trost, IV
*Assistant Examiner*—Charles C Jiang
(74) *Attorney, Agent, or Firm*—Frommer Lawrence & Haug LLP; William S. Frommer; Paul A. Levy

(57) ABSTRACT

A communication system for a plurality of devices performing communications through a network is provided. The communication system includes a transmitter/receiver, a reception status detector, and a recorder. The transmitter/receiver is included in each of the plurality of devices and configured to alternately transmit a data packet with ID information indicating time to another device and receive the data packet from the device periodically in the plurality of devices. The reception status detector is included in each of the plurality of devices and configured to detect whether the data packet is periodically received based on the ID information added to the data packet received from another device. The recorder is configured to record a result detected by the reception status detector in each of the plurality of devices.

4 Claims, 8 Drawing Sheets

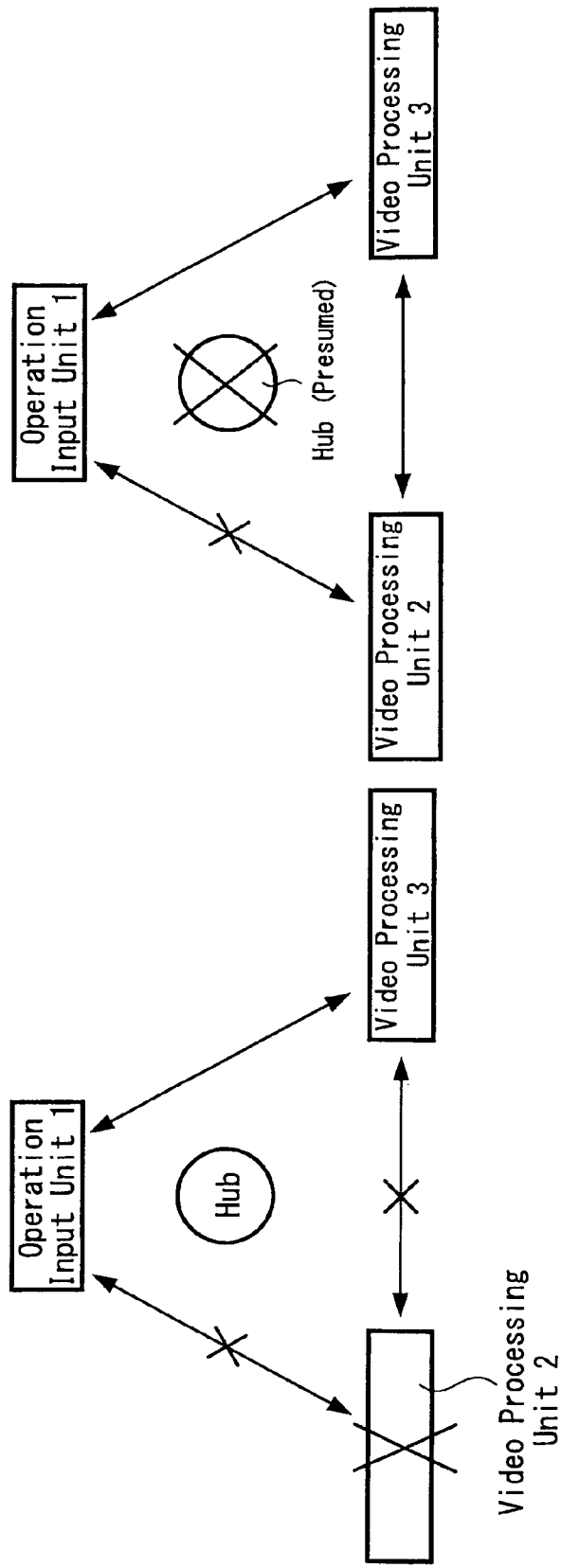

COMMUNICATION SYSTEM, METHOD OF PROVIDING INFORMATION THEREIN AND COMMUNICATION DEVICE

CROSS REFERENCES TO RELATED APPLICATIONS

The present invention contains subject matter related to Japanese Patent Application JP 2006-350108 filed in the Japanese Patent Office on Dec. 26, 2006, the entire contents of which being incorporated herein by reference.

BACKGROUND OF THE INVENTION

1. Field of the Invention

The present invention relates to a communication system in which a plurality of devices perform communications through a network, and particularly relates to a communication system having such functions of preventing a communication failure from occurring and providing information for identifying a location of failure in the case where the communication failure occurs.

2. Description of the Related Art

An image special effect apparatus or a switcher is used to apply a special effect to a video signal at a video production site such as a television broadcasting station. The switcher is configured to have one or more video processing units (matrix switcher, mixer/keyer, and DME), which is a switcher main unit, and an operation input unit for operating the video processing units.

As shown in FIG. 1, as a connection mode for exchanging a control command and device status information between the operation input unit and respective video processing units and between the respective video processing units, there is typically provided such a mode that an operation input unit 51 and respective video processing units 52 and 53 are connected in a star LAN (Local Area Network) using a hub 54.

In the case of the above connection mode, the connections are respectively established between the operation input unit and video processing units and between the respective video processing units in accordance with TCP/IP protocol. The control command and device status information are exchanged at a period of one field in which a video signal is input into the video processing unit (for example, once every 16.7 msec in the case of NTSC, and once every 20 msec in the case of PAL).

In the case where the exchange of the control command and device status information is disrupted for one second or longer, the TCP/IP connection is once cancelled and then the connection is reestablished. While the connection is not established, it may not be possible to control the video processing unit from the operation input unit.

In the past, when the connection is not established or the connection is not maintained for a long time, more specifically, when there occurs such failure that the operation input unit is unable to control the video processing unit, it has been difficult to identify the cause thereof. Specifically, it is difficult even using measuring instrument to determine whether a failure is caused in the device of the switcher, such as the operation input unit and the video processing unit, or caused in the LAN (such as the hub).

However, since the switcher is an apparatus in which the video processing unit may need to be controlled in real-time by an operation of the operation input unit, it is inconvenient if the control is interrupted even temporarily. Therefore, it may be required to identify the cause of such communication failure and correct the failure and furthermore to prevent such failure from occurring by detecting a location where the communication failure is likely to occur.

In the past, various apparatuses have been proposed as an apparatus for monitoring traffic on the network (refer to Japanese Unexamined Patent Application Publication No. H11-177549, for example), however, there has not been proposed such apparatus having functions of preventing a communication failure from occurring and providing information for identifying the location of failure in the case where the communication failure occurs.

SUMMARY OF THE INVENTION

It is desirable to provide a communication system for a plurality of devices performing communications through a network, such as the switcher shown in FIG. 1, having functions of preventing a communication failure from occurring and providing information for identifying a location of failure in the case where the communication failure occurs.

According to an embodiment of the present invention, there is provided a communication system for a plurality of devices performing communications through a network, including a transmitter/receiver, a reception status detector, which are provided in each of the plurality of devices, and a recorder. The transmitter/receiver is configured to alternately transmit a data packet with ID information indicating time to another device and receive the data packet from the device periodically. The reception status detector is configured to detect whether the data packet is periodically received based on the ID information added to the data packet received from another device. The recorder is configured to record a result detected by the reception status detector.

According to another embodiment of the present invention, there is provided a communication device for performing communications with a plurality of devices through a network, including a transmitter/receiver, a reception status detector, and a recorder. The transmitter/receiver is configured to alternately transmit a data packet with ID information indicating time to another device and receive the data packet from the device periodically. The reception status detector is configured to detect whether the data packet is periodically received based on the ID information added to the data packet received from another device. The recorder is configured to record a result detected by the reception status detector.

According to further embodiment of the present invention, there is provided a method of providing information in a communication system for a plurality of devices performing communications through a network. The method includes: alternately transmitting a data packet with ID information indicating time to another device and receiving the data packet from the device periodically in the plurality of devices; detecting whether the data packet is periodically received based on the ID information added to the data packet received from another device in the plurality of devices; and recording the detection result of the plurality of devices in a recorder.

According to the embodiments of the present invention, each device performing communications through the network periodically exchanges the data packet with the ID information indicating the time with other devices. Further, each device detects whether the data packet is periodically received or not based on the ID information added to the received data packet. Therefore, if a delay occurs when receiving the data packet from any other device and if an interruption occurs when receiving the data packet from any other device, such cases are detected.

The reception status of the data packets from other devices is detected in individual devices as described above, and accordingly information on the reception status of all the devices is recorded in the recorder.

In the case where the communication failure occurs, the connection may not be disrupted abruptly but the delay in receiving the data packet or failure in receiving the data packet occurs as a preliminary stage of the disruption in the communication involving a location causing the failure.

Therefore, the information on the reception status of individual devices recorded in the recorder can be used as the information to prevent the communication failure from occurring. In addition, the information on the reception status of individual devices, which has been recorded in the recorder, can be used for identifying the location of failure even when the communication failure occurs.

According to the embodiments of the present invention, it is possible to obtain such effect that the information on the reception status of individual devices recorded in the recorder of the communication system can be used for preventing the communication failure from occurring and for identifying the location of failure when the communication failure occurs in the communication system for the plurality of devices performing communications through the network.

BRIEF DESCRIPTION OF THE DRAWINGS

FIGS. 9A and 9B are diagrams showing examples of displaying locations of failure based on the processing indicated in FIG. 7.

DESCRIPTION OF THE PREFERRED EMBODIMENTS

Figure 2:
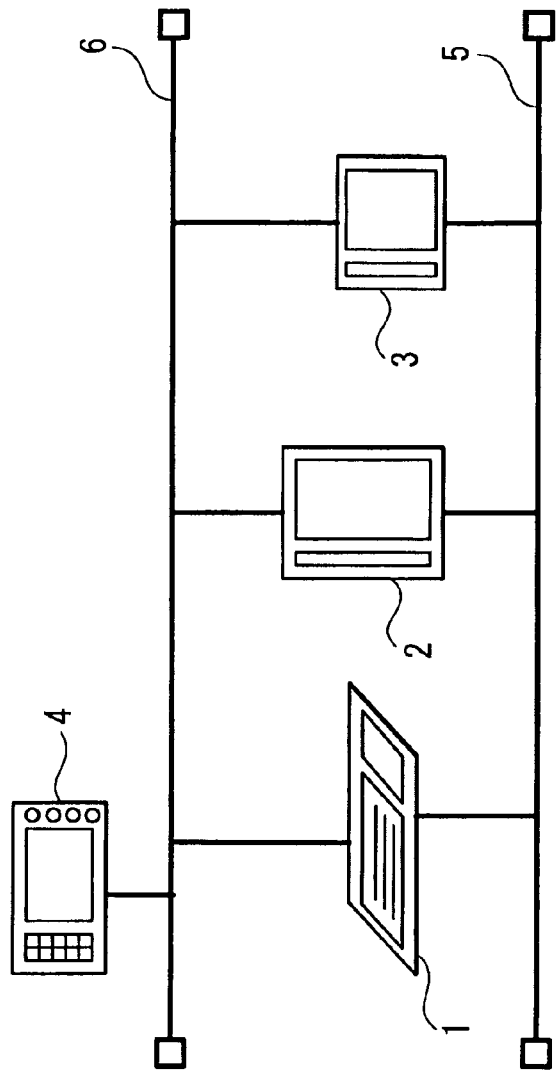
FIG. 2 is a diagram showing an example of the whole configuration of a switcher to which an embodiment of the present invention is applied.

Hereinafter, embodiments of the present invention, which is applied to a switcher, are specifically explained using the accompanied drawings. FIG. 2 is a diagram showing an example of the whole configuration of a switcher to which the embodiments of the present invention is applied. The switcher includes an operation input unit 1, video processing units 2 and 3 representing a switcher main unit, and an information display unit 4.

Figure 1:
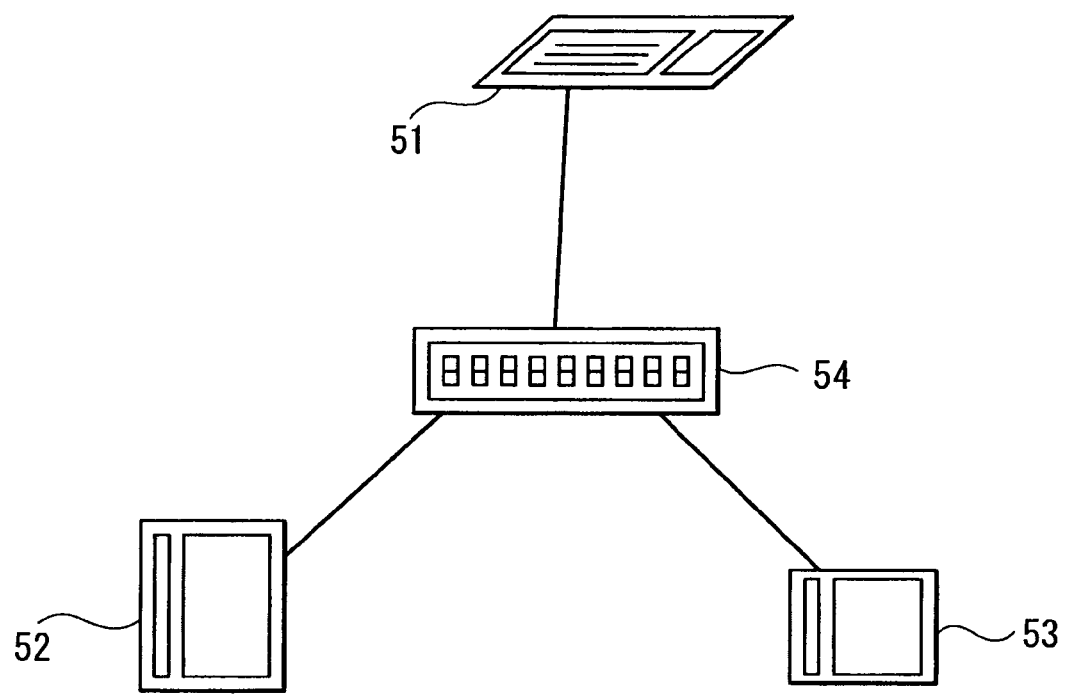
FIG. 1 is a diagram showing a mode of connection between an operation input unit and video processing units in a switcher based on a star LAN.

The operation input unit 1 and the video processing units 2 and 3 of the switcher main unit are connected through a device control Ethernet® 5 in accordance with the TCP/IP protocol. The Ethernet® 5 is a star LAN using a hub as shown in FIG. 1 and used for transmitting and receiving information for the real-time control of the video processing units 2 and 3.

In addition, the operation input unit 1, the video processing units 2 and 3, and the information display unit 4 are also connected through a data transfer Ethernet® 6. The Ethernet® 6 is a star LAN using a hub as shown in FIG. 1 and used for transmitting and receiving information not in real time.

The video processing unit 2 includes a matrix switcher, a mixer/keyer, and a CPU that conducts internal control of the video processing unit 2 and performs network communications. The video processing unit 3 includes a DME (Digital Mix Effect apparatus) and a CPU that conducts internal control of the video processing unit 3 and performs network communications. A video signal is input into the video processing units 2 and 3 through a dedicated signal line (not illustrated).

The operation input unit 1 includes a button switch for switching video by operating the matrix switcher of the video processing unit 2, a lever, a button switch and the like used for applying a special effect on the video by operating the mixer/keyer of the video processing unit 2 and the DME of the video processing unit 3, and a CPU that conducts internal control of the operation input unit 1 and performs network communications.

The information display unit 4 includes a display with an operation unit for GUI (Graphical User Interface), and a CPU that conducts internal control of the information display unit 4 and performs network communications. The information display unit 4 is arranged at a position close to the operation input unit 1 (at such a position that an operator of the operation input unit 1 can perform an operation and a confirmation of the information on a GUI screen of the information display unit 4).

The CPU in the operation input unit 1 is configured to transmit a data packet, in which ID information indicating the present time is added to a control command correspondingly to a operation state of the button switch, the lever and the like in the operation input unit 1, to the video processing units 2 and 3. The data packet is transmitted through the device control Ethernet® 5 at a period of one field in which a video signal is input into the video processing units 2 and 3 (for example, once every 16.7 msec in the case of NTSC, and once every 20 msec in the case of PAL).

Upon receiving the data packet from the operation input unit 1, the internal CPUs of the video processing units 2 and 3 conduct the internal control of the video processing units 2 and 3 in accordance with the control command. Then, the data packet, with data including the ID information having been added to the control command, added to the status information of the device that is changed as a result of the control, is transmitted to the operation input unit 1 through the Ethernet® 5.

In addition, the data packet, in which the ID information indicating the present time is added to the status information of the device, is also transmitted and received between the respective internal CPUs of the video processing units 2 and 3 through the Ethernet® 5 at a period of one field in which a video signal is input into the video processing units 2 and 3.

Figure 3:
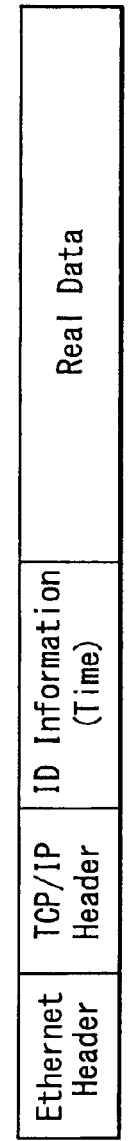
FIG. 3 is a diagram showing a structure of a data packet exchanged between an operation input unit and video processing units and between the respective video processing units in FIG. 2.

FIG. 3 is a diagram showing a structure of the data packet thus exchanged between the operation input unit 1 and each of the video processing units 2 and 3 and between the respective video processing units 2 and 3 through the Ethernet® 5. The ID information indicating the time is added before the real data (the control command or status information of the device), and further a TCP/IP header and an Ethernet® header are added before the ID information.

Each of the internal CPUs of the operation input unit 1 and video processing units 2 and 3 conducts processing of detecting whether the data packet is received at the field period through the Ethernet® 5 or not based on the ID information in the data packet. In the detection processing, the time each data packet is received is stored in an internal memory of the CPU and delay information is prepared in the case where the delay is detected on the reception of the data packet. The CPUs transmit the prepared delay information to the information display unit 4 through the data transfer Ethernet® 6.

Figure 4:
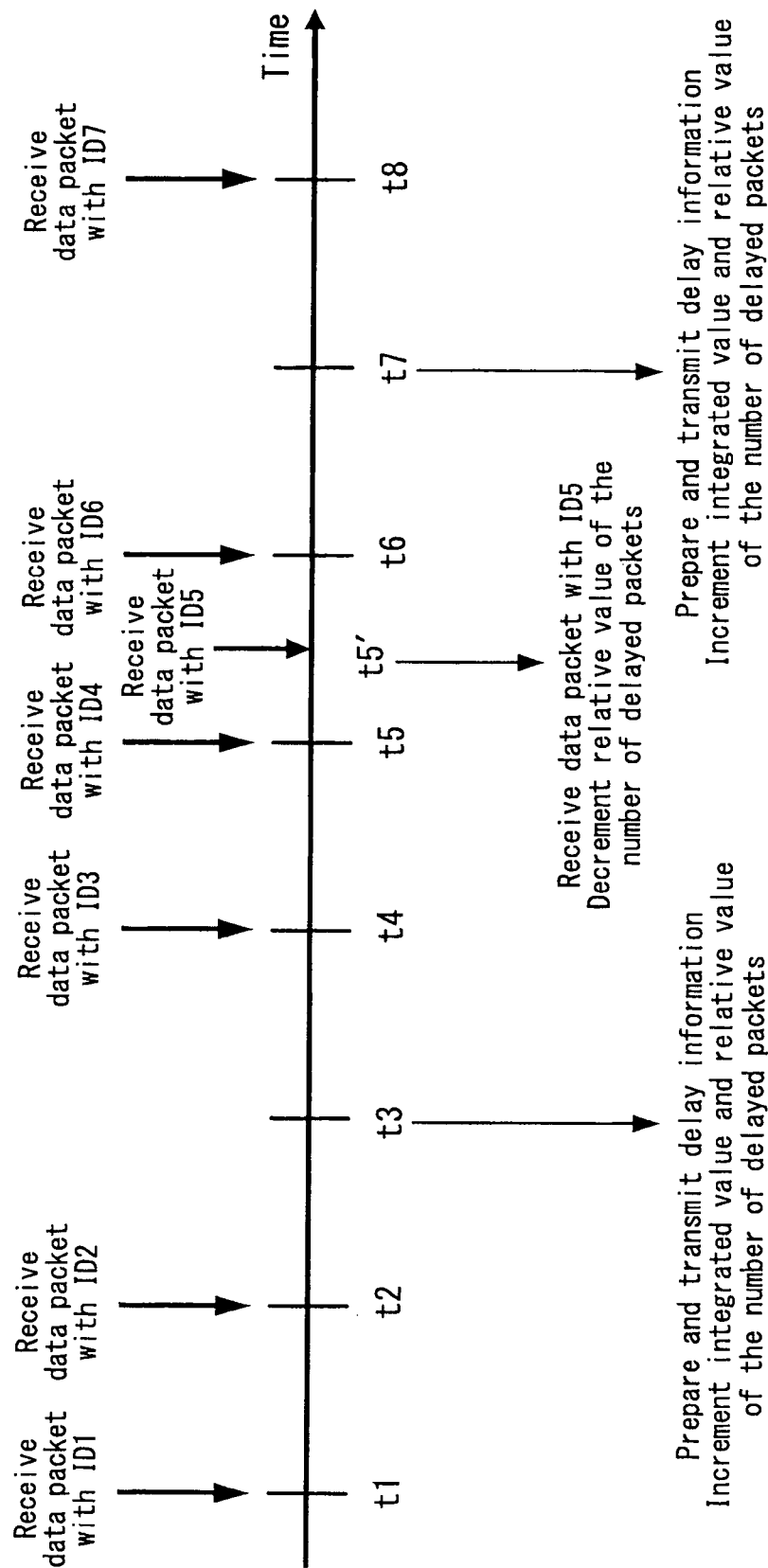
FIG. 4 is a diagram showing delay information preparation processing conducted by the operation input unit and each video processing unit in FIG. 2.

FIG. 4 is a diagram showing a specific example of delay information preparation processing performed by one of the internal CPUs of the operation input unit 1 and the video processing units 2 and 3 on the data packet received from another device among the operation input unit 1 and the video processing units 2 and 3. As shown in FIG. 4, the ID information added to the received individual data packets is shown using numerals such as ID1, ID2, ID3, - - - .

The data packet with ID1 and the data packet with ID2 are respectively received at the time t1 and time t2 (which are approximately the same times as those respectively indicated by ID1 and ID2, and an interval between t1 and t2 is one field period). However, the data packet with ID3 (which is the ID indicating approximately the same time as the time t3) is not received at the time t3 one field period after the time t2.

The CPU detects the delay on the reception of the data packet at the time t3, prepares delay information and transmits the information to the information display unit 4 (FIG. 2) through the data transfer Ethernet® 6. Further, the internal memory in the CPU has an area for storing integrated value and relative value of the number of delayed packets corresponding to the time, in which the integrated value and the relative value at the present time are respectively incremented by one (if the previous integrated value and relative value are an initial value 0, the integrated value and the relative value respectively become 1).

According to the TCP/IP protocol, in the case where the data packet is not transmitted to the receiving device, the device transmitting the data packet detects such transmission failure and again transmits the same data packet. As a result, the data packet with ID3 is received with delay at the time t4 one field period after the time t3.

Subsequently, the data packet with ID4 is received at the time t5 one field period after the time t4, and then the data packet with ID5 is received at the time t5' that is earlier than the elapse of one field period from the time t5.

The CPU detects such early reception of the data packet at the time t5', and decrements only the relative value of the number of delayed packets at the present time by one (in the case where the previous relative value is one, the relative value returns to 0).

Subsequently, the delay is eliminated by receiving the data packet with ID6 (which is the ID indicating approximately the same time as the time t6) at the time t6 one field period after the time t5, however, the data packet with ID7 (which is the ID indicating approximately the same time as the time t7) is not received at the time t7 one field period after the time t6.

The CPU detects the delay on the reception of the data packet at the time t7, prepares delay information and transmits the information to the information display unit 4 (FIG. 2) through the data transfer Ethernet® 6. Further, the CPU increments the integrated value and the relative value of the number of delayed packets at the present time respectively by one (if the previous integrated value and relative value are [1, 0,] the values become [2, 1] respectively).

Subsequently, the data packet with ID7 is received with delay at the time t8 one field period after the time t7.

The internal CPU of the information display unit 4 displays warning to inform an operator of the occurrence of delay on a display of the information display unit 4 (or, lights a pilot lamp provided in the information display unit 4) each time the delay information prepared by the delay information preparation processing is received through the Ethernet® 6.

Figure 5:
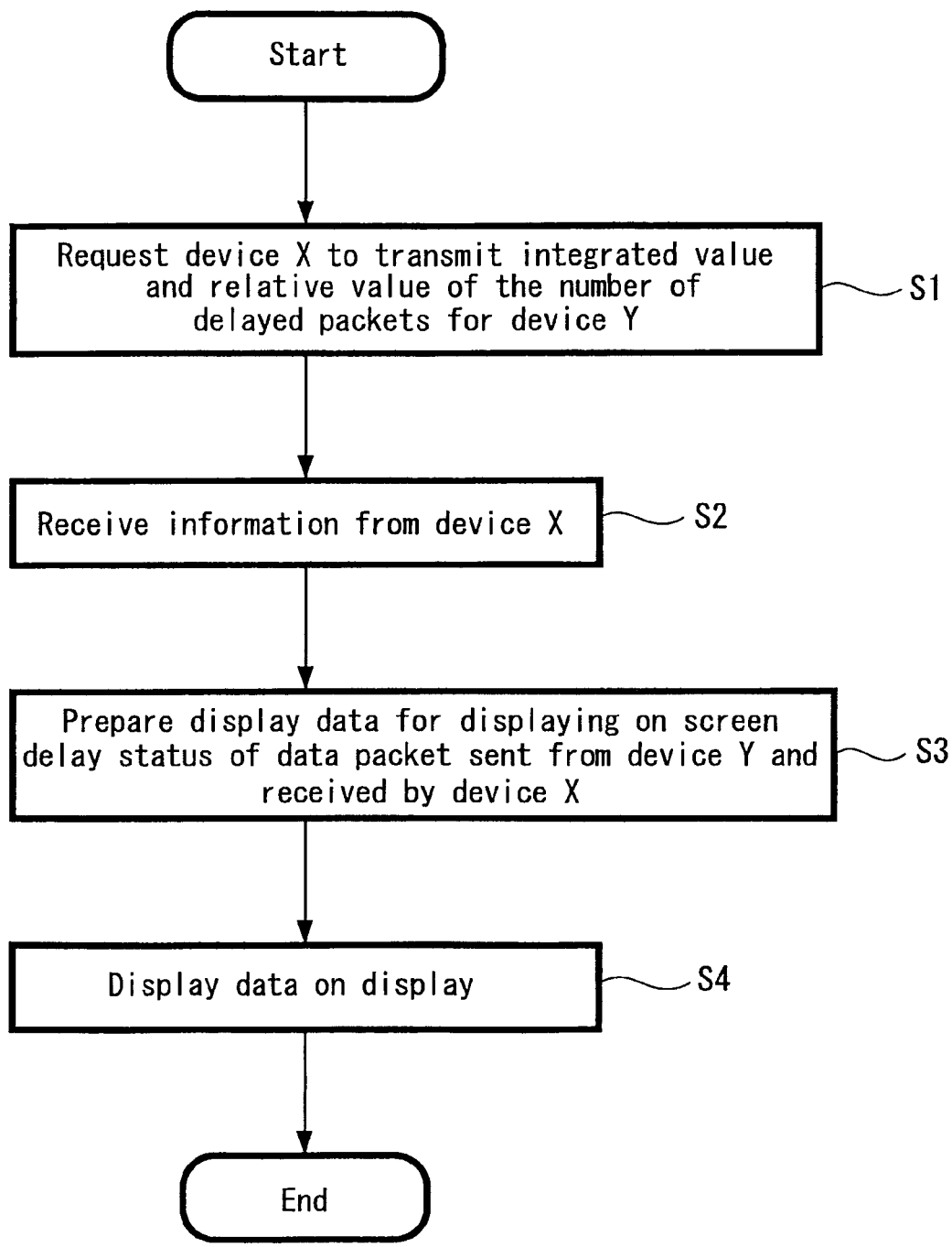
FIG. 5 is a flow chart of delay status display processing conducted by an information display unit in FIG. 2.

An operation menu on the GUI screen of the information display unit 4 includes an operation of selecting any one (referred to as a device X) of the operation input unit 1 and the video processing units 2 and 3 and displaying on the device X a delay status of the data packet received from any one (referred to as a device Y) of remaining devices. When such operation is performed, the internal CPU of the information display unit 4 conducts delay status display processing as shown in FIG. 5.

In the delay status display processing, first, the internal CPU of the information display unit 4 transmits to the device X through the Ethernet® 6 a command requesting the information on the integrated value and relative value of the number of delayed packets for the data packet received from the device Y (step S1).

The internal CPU of the device X receiving the command transmits the information on the integrated value and relative value of the number of delayed packets for the device Y, which has been stored in the internal memory of the CPU, to the information display unit 4 through the Ethernet® 6.

The internal CPU of the information display unit 4 receives the information on the integrated value and relative value of the number of delayed packets from the device X (step S2) and using the information, prepares display data for displaying on a screen the delay status of the data packet from the device Y received by the device X (step S3). Then, the display data is displayed on the display of the information display unit 4 (step S4), and the process ends.

Figure 6:
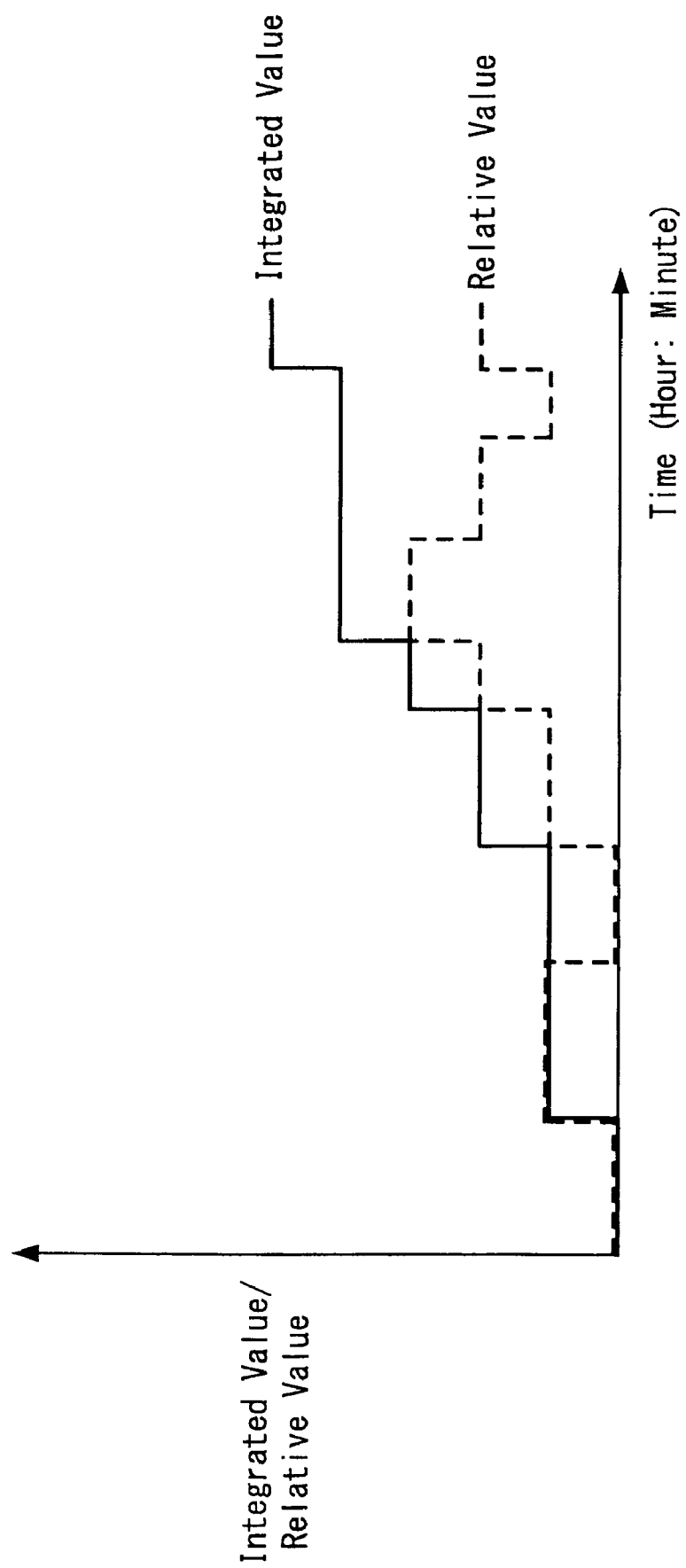
FIG. 6 is a diagram showing an example of displaying a delay status based on the processing indicated in FIG. 5.

FIG. 6 is a diagram showing an example of the delay status displayed on the information display unit 4. As shown in FIG. 6, a temporal change in the integrated value and relative value of the number of delayed packets up to the present is shown in a graph, where a horizontal axis represents time and a vertical axis represents the integrated value and relative value of the number of delayed packets.

A combination of the device X and device Y is optionally selected from the operation input unit 1 and the video processing units 2 and 3 on the GUI screen of the information display unit 4, and such graph of the delay status can be displayed for the selected combination.

In the case where the communication failure occurs, the connection may not be disrupted suddenly but the delay in receiving the data packet or failure in receiving the data packet occurs as the preliminary stage of the disruption in the communication involving the location causing the failure.

Therefore, the operator of the operation input unit 1 displays the information on the delay status of individual devices recorded in the internal CPUs of the operation input unit 1 and video processing units 2 and 3 as the graph on the GUI screen and uses the information to prevent the communication failure from occurring. Further, even in the case where the communication failure has occurred, the information on a recording state of respective devices, which has been recorded, is displayed as the graph on the GUI screen so that the information can be used to identify the location of failure.

Each of the internal CPUs of the operation input unit 1 and video processing units 2 and 3 conducts the processing of detecting whether the data packet is received at the field period based on the ID information in the data packet as described above. However, in the case where the exchange of the data packet with any device is interrupted for one second or longer, the TCP/IP connection is cancelled and subsequently the connection is reestablished. Then, the CPU prepares failure information indicating that the reception of the data packet is interrupted and transmits the failure information to the information display unit 4 through the data transfer Ethernet® 6.

Figure 7:
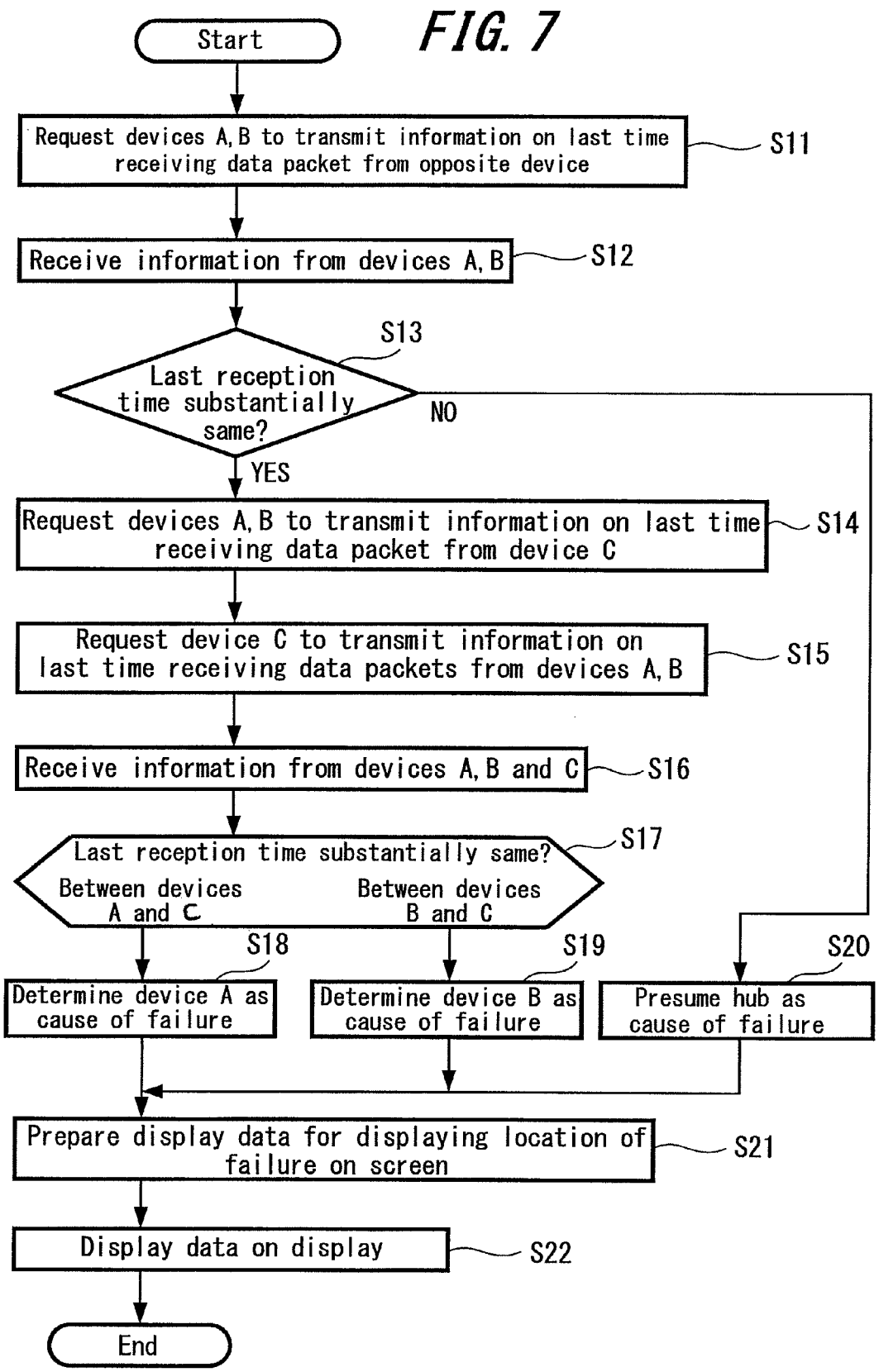
FIG. 7 is a flow chart of failed location detection processing conducted by the information display unit shown in FIG. 2.

When the failure information is received, the internal CPU of the information display unit 4 conducts processing of detecting the failed location as shown in FIG. 7.

In the failed location detection processing, first, the internal CPU of the information display unit 4 transmits a command requesting information on last time receiving the data packet from the opposite device to each of the two devices (referred to as devices A and B), in which the TCP/IP connection has been cancelled, among the operation input unit 1 and the video operation units 2 and 3 through the Ethernet® 6 (step S11).

The internal CPU of the device A transmits the information on the last time receiving the data packet from the device B out of the reception times of respective data packets stored in the internal memory of the CPU to the information display unit 4 through the Ethernet® 6. The internal CPU of the device B also transmits the information on the last time receiving the data packet from the device A out of the reception times of respective data packets stored in the internal memory of the CPU to the information display unit 4 through the Ethernet® 6.

The internal CPU of the information display unit 4 receives the information on the last time receiving the data packet, transmitted from each of the devices A and B (step S12). Using the information received, the CPU compares the time the device A receiving last time the data packet from the device B with the time the device B receiving last time the data packet from the device A to determine whether the two reception times are approximately the same (a difference is about one field period that is a period of exchanging the data packet) (step S13).

In the case where the communication failure is caused by the failure of either the device A or B, the device A may fail to receive data packets from the device B and approximately simultaneously the device B may also fail to receive data packets from the device A. Therefore, in the case of YES at step S13, it may be determined that the communication failure has occurred between the devices due to the failure of either the device A or B. Further, in that case, the same phenomenon may occur between the device of either the devices A and B causing the communication failure and the remaining one device (referred to as a device C) in the video processing units 2 and 3.

Then, in the case of YES at step S13, the internal CPU of the information display unit 4 transmits to the devices A and B through the Ethernet® 6 the command requesting the information on the last time receiving the data packet from the device C (step S14). In addition, the command requesting the information on the last time receiving the data packet from the devices A and B respectively is also transmitted to the device C through the Ethernet® 6 (step S15).

Based on the command received, each of the internal CPUs of the devices A and B transmits the information on the last time receiving the data packet from the device C to the information display unit 4 through the Ethernet® 6. The internal CPU of the device C also transmits the information on the last time receiving the data packet from each of the devices A and B to the information display unit 4 through the Ethernet® 6 based on the received command.

The internal CPU of the information display unit 4 receives the information from each of the devices A, B and C (step S16), and determines whether the time of the last reception is approximately the same either between the devices A and C, or between the devices B and C (step S17).

Then, in the case where the time of the last reception is approximately the same between the devices A and C, it may be determined that the communication failure has occurred between the devices A and C due to the failure caused by either the device A or C. Therefore, with the result determined at step S13 (the determined result indicating that the communication failure has occurred due to the failure caused by either the device A or B) it is determined that the communication failure is caused by the device A (step S18).

Also, in the case where the time of the last reception is approximately the same between the devices B and C at step S17, it may be determined that the communication failure has occurred between the devices B and C due to the failure caused by either the device B or C. Therefore, with the result determined at step S13 it is determined that the communication failure is caused by the device B (step S19).

Here, in the case where at step S13 the last time the device A receiving the data packet from the device B is not approximately the same as the last time the device B receiving the data packet from the device A (the difference of the two reception times is greater than one field period), the communication failure may have occurred differently from the case in which the communication failure is caused by either device A or B. In that case, there is a possibility that such communication failure is caused by the failure occurred in the processing conducted by the internal CPU of the hub used for the device control Ethernet® 5 instead of the failure on the switcher side such as the devices A and B. (Although the internal CPU of the hub may detect a communication failure occurred due to a physical failure in the hub, the failure occurred in the processing conducted by the internal CPU of the hub may not be detected by the CPU itself.)

Then, in the case of NO at step S13, it is presumed that the communication failure is caused by the hub used for the Ethernet® 5 (here, not determined but only presumed, because the hub is other device than the switcher itself) (step S20).

After the processing at step S18, S19 or S20, the internal CPU of the information display unit 4 prepares the display data for displaying on the screen the location causing the communication failure based on the result determined or presumed at the relevant step (step S21). Then, the CPU displays the display data on the display of the information display unit 4 (step S22), and the process ends.

Figure 8A:
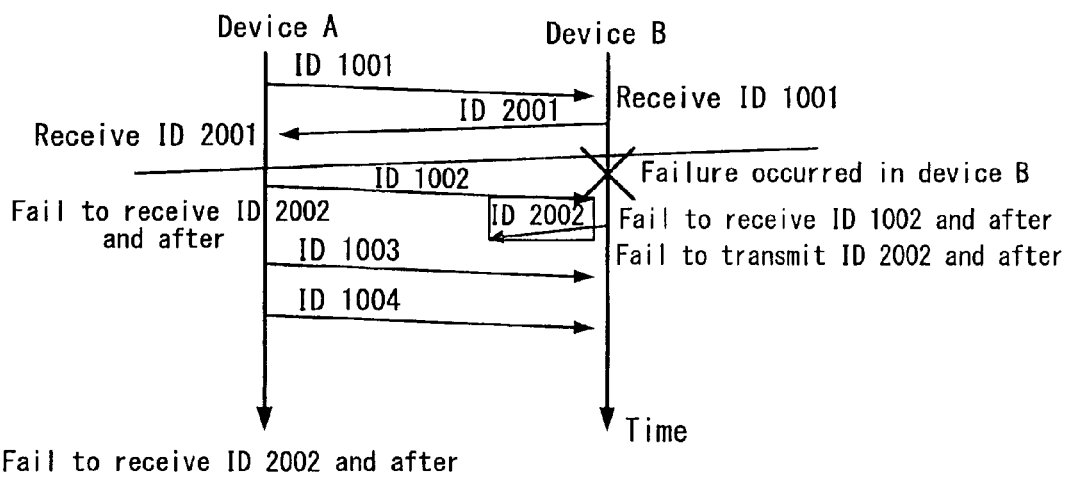
FIGS. 8A and 8B are diagrams showing specific examples of communication failure.
Figure 8B:
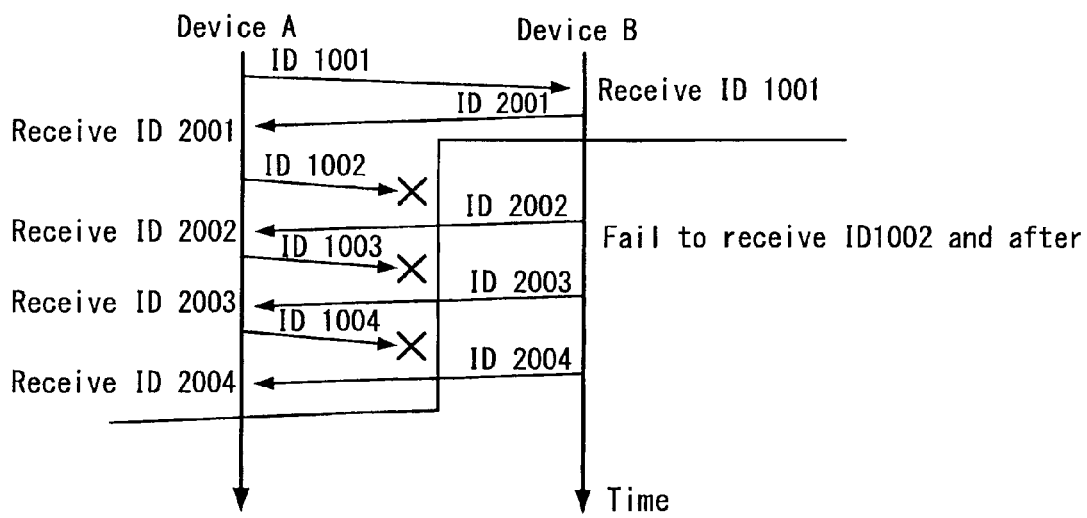

FIGS. 8A and 8B are diagrams showing examples of specific cases of communication failure (here, ID information added to individual data packets is also indicated by numerals such as ID1001, ID1002, - - - , and ID2001, ID2002).

FIG. 8A illustrates such a case that the communication failure is caused by the device B out of the devices A and B (TCP/IP connection is cancelled between the devices). The device A transmits the data packet with ID1001 to the device B, and the device B receives the transmitted data packet. Subsequently, the device B transmits the data packet with ID2001 to the device A, and the device A receives the transmitted data packet.

Subsequently, the device A transmits the data packet with ID1002 to the device B, however, the transmitted data packet is not received by the device B due to a trouble occurred in the device B. Also, the data packets with ID2002 and subsequent ID numbers are not transmitted from the device B to the device A due to the trouble. In addition, the data packets with ID1003 and subsequent ID numbers are transmitted from the device A to the device B, however, those data packets are not received by the device B.

Then, if a state of such interruption in the exchange of the data packet continues for one second or longer, the TCP/IP connection between the device A and the device B is cancelled.

In the above-described example, the last data packet from the device B received by the device A is the data packet with ID2001. Also, the last data packet from the device A received by the device B is the data packet with ID1001. The reception times for the two data packets are approximately the same (the difference is about one field period that is a period of exchanging the data packet), and therefore it is determined YES at step S13 in the failed location detection processing indicated in FIG. 7. In addition, the data packets are also not received between the failed device B and the remaining device C similarly to the example shown in FIG. 8A and the last reception times of the data packets become approximately the same. Accordingly, the process proceeds from step S17 of the failed location detection processing to step S19 indicated in FIG. 7, at which it is determined that the device B causes the communication failure.

FIG. 8B illustrates such a case that the communication failure may be caused by the hub used for the Ethernet® 5 instead of the devices A and B (TCP/IP connection is cancelled between the devices). The device A transmits the data packet with ID1001 to the device B, and the device B receives the transmitted data packet. Subsequently, the data packet with ID2001 is transmitted from the device B to the device A, and the device A receives the transmitted data packet.

Subsequently, the device A transmits the data packet with ID1002 to the device B, but the transmitted data packet is not received by the device B. However, the data packets with ID2002 and subsequent ID numbers are transmitted from the device B to the device A, and the device A receives those transmitted data packets. In addition, the data packets with ID1003 and subsequent ID numbers are transmitted from the device A to the device B, however, those transmitted data packets are also not received by the device B.

Then, if the state of such interruption in the exchange of the data packet continues for one second or longer, the TCP/IP connection between the devices A and B is cancelled.

In the above-described example, the last data packet from the device A received by the device B is the data packet with ID1001. However, the device A receives the last data packet from the device B immediately before the cancellation of the TCP/IP connection (approximately one second after the device B receives the last data packet). Therefore, there is a difference larger than one field period, which is the period of exchanging the data packet, between the reception times of those two data packets. Therefore, the process proceeds from step S13 in the failed location detection processing to step S20 as indicated in FIG. 7, at which it is determined that the communication failure is presumably caused by the hub used for the Ethernet® 5.

FIGS. 9A and 9B are diagrams showing examples of displaying locations of failure on the display of the information display unit 4 based on the failed location detection processing indicated in FIG. 7. Here, FIG. 9A shows an example in which it is determined that the communication failure is caused by the video processing unit 2 shown in FIG. 2. As shown in the figure, X-marks are indicated, being overlapped with images of the video processing unit 2, an arrow connecting the operation input unit 1 and the video processing unit 2, and an arrow connecting the video processing units 2 and 3 in computer graphics schematically depicting the connections among the operation input unit 1 and the video processing units 2 and 3 based on a star LAN using a hub.

FIG. 9B shows an example in which it is determined that the communication failure may be caused by the hub used for the Ethernet® 5. As shown in this figure, X-marks are indicated, being overlapped with images of the hub and the arrow connecting the devices, TCP/IP connection of which is cancelled, (in this figure, between the operation input unit 1 and the video processing unit 2, for example) in schematic computer graphics similar to FIG. 9A. In addition, characters indicating that it is the presumed result are also shown for the hub.

As heretofore described, in the case where the communication failure occurs, the results of determination and presumption made for the location of failure are automatically displayed based on the processing of the internal CPU of the information display unit 4. Accordingly, the operator of the operation input unit 1 may identify the location of failure using not only the graph of the delay status shown in FIG. 6 but also the automatically displayed results of determination and presumption.

It should be noted that the embodiment of the present invention is applied to the switcher having the three devices of the operation input unit 1 and video processing units 2 and 3 connected through the device control Ethernet® 5 (Ethernet® for real-time control). However, the embodiment of the present invention is not limited thereto but may be applied to a switcher in which the operation input unit and one video processing unit are connected through such real-time control Ethernet® or a switcher in which the operation input unit and three or more video processing units are connected through such real-time control Ethernet®. Then, in the case where the switcher has only two devices connected through the real-time control Ethernet®, steps S14 through S19 in the processing indicated in FIG. 7 may be omitted and it may be determined that the switcher has the cause of the communication failure in the case of YES at step S13.

Further, the embodiment of the present invention is applied to the switcher, however, may be applied to any communication systems including a plurality of devices performing the communications through the network (particularly, to communication systems requiring the real-time control of the devices).

It should be understood by those skilled in the art that various modifications, combinations, sub-combinations and alterations may occur depending on design requirements and other factors insofar as they are within the scope of the appended claims or the equivalents thereof.

What is claimed is:

1. A communication system for a plurality of devices performing communications through a network, comprising:
   a transmitter/receiver included in each of the plurality of devices and configured to alternately transmit a data packet to another device and receive the data packet from the device periodically;
   a reception status detector included in each of the plurality of devices and configured to detect whether the data packet is periodically received and prepare failure information in the case an interruption occurred in the reception of the data packet; and
   a failed location detector configured to identify which of a first device and second device, caused a communication failure,
   wherein the identifying includes:
   (1) a request for information from the first device and the second device on a respective last time a first data packet was received from the other device,
   (2) when the respective last times of receiving the particular data packet are approximately the same, a request for information from the first device and the second device on the last time each received a second data packet from a third device and a request for information from the third device on the last time a third data packet was received from each of the first device and the second device, and (3) based upon the last times of receiving the second data packets and the last times of receiving the third data packet, determining which of the first device and second device caused the communication failure.

2. The communication system according to claim 1, further comprising:

a display controller configured to control displaying on a screen a location causing the communication failure based on a result detected by the failed location detector.

3. The communication system according to claim 1, wherein the plurality of devices include an operation input unit and at least one video processing unit constituting a switcher.

4. A method of communication for a plurality of devices performing communications through a network, comprising:

alternately transmitting a data packet to another device and receive the data packet from the device periodically;

detecting whether the data packet is periodically received and prepare failure information in the case an interruption occurred in the reception of the data packet; and identifying which of a first device and second device, caused a communication failure, wherein the identifying includes:

(1) requesting information from the first device and the second device on a respective last time a first data packet was received from the other device, (2) when the respective last times of receiving the particular data packet are approximately the same, requesting information from the first device and the second device on the last time each received a second data packet from a third device and requesting information from the third device on the last time a third data packet was received from each of the first device and the second device, and (3) based upon the last times of receiving the second data packets and the last times of receiving the third data packet, determining which of the first device and second device caused the communication failure.

\* \* \* \* \*